Patented June 30, 1931

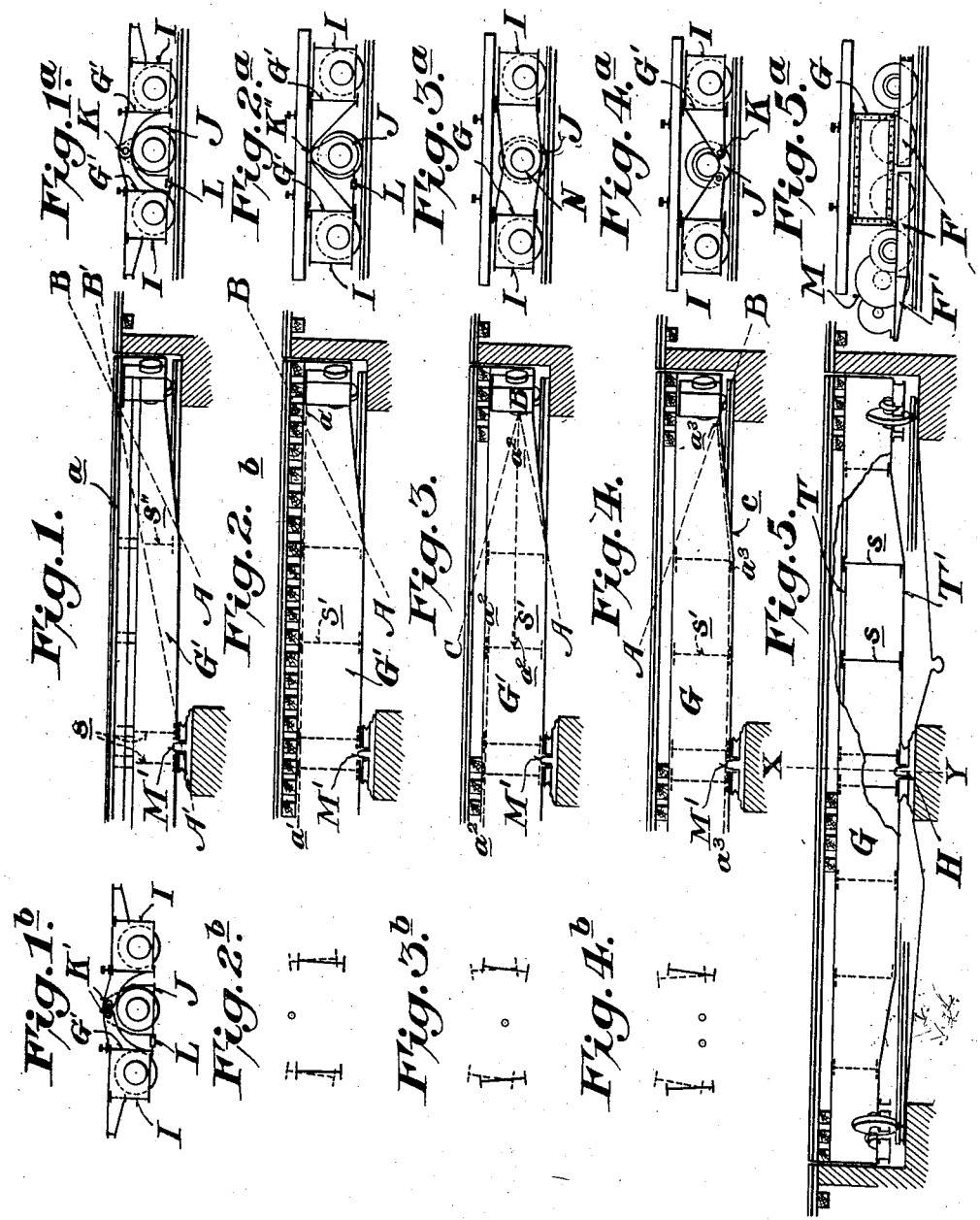

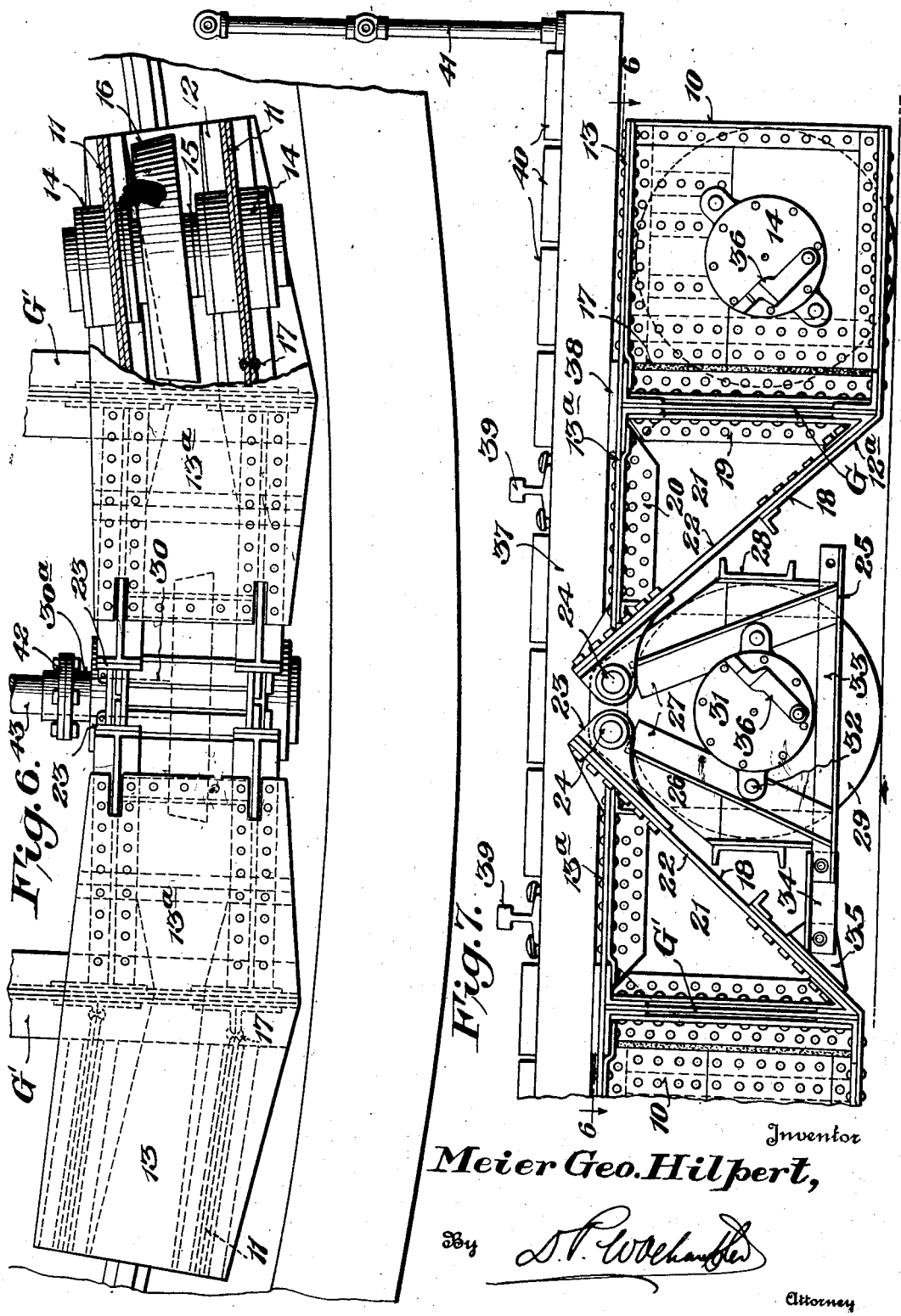

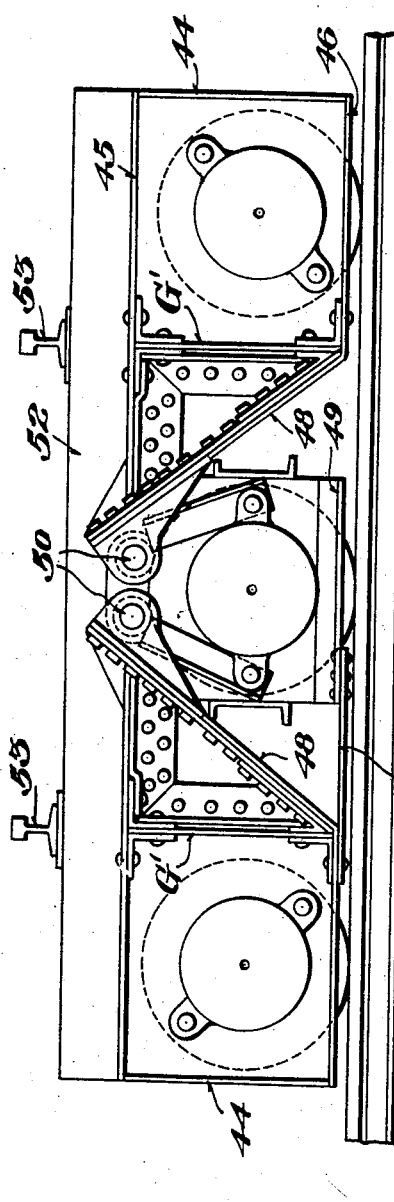

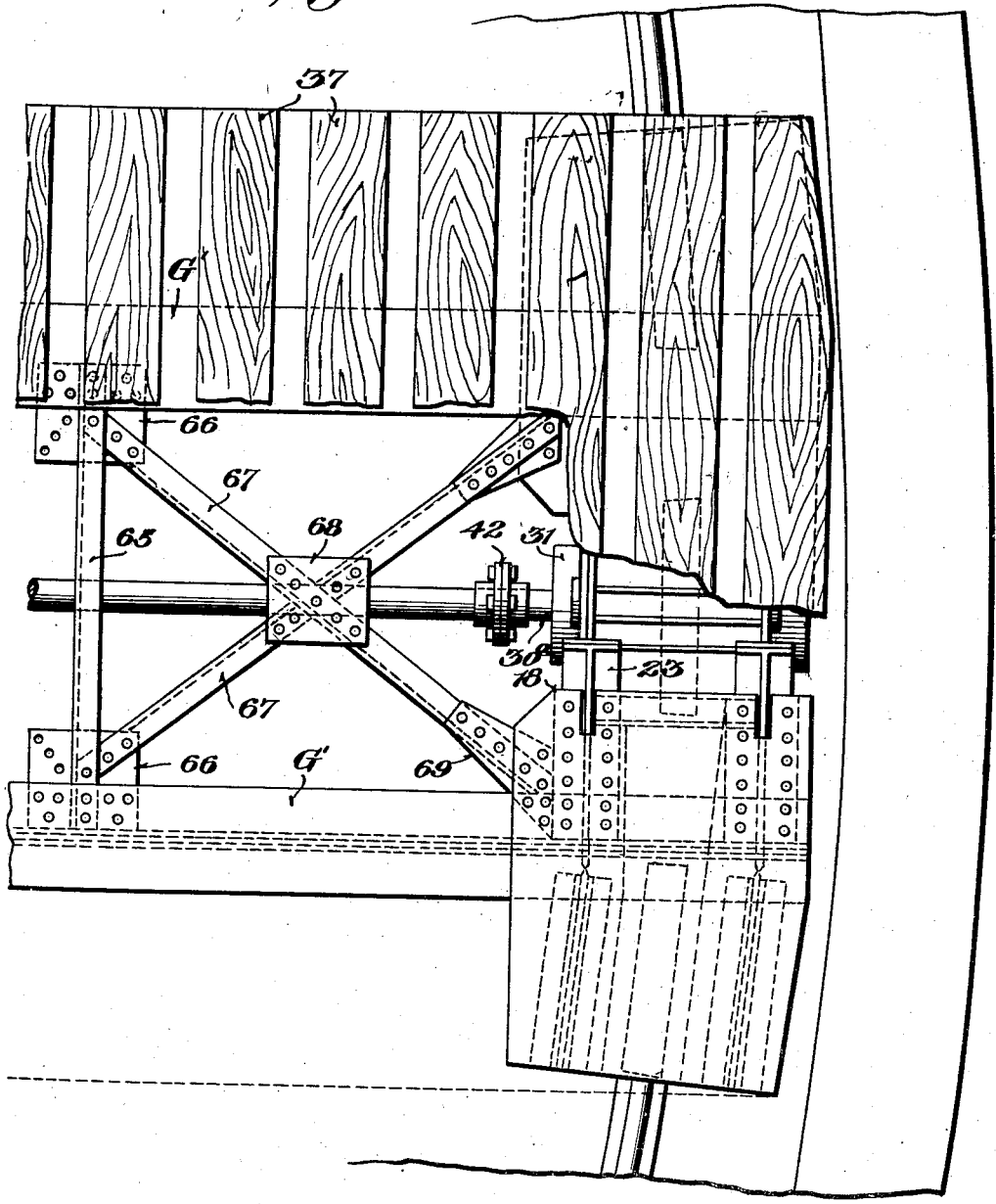

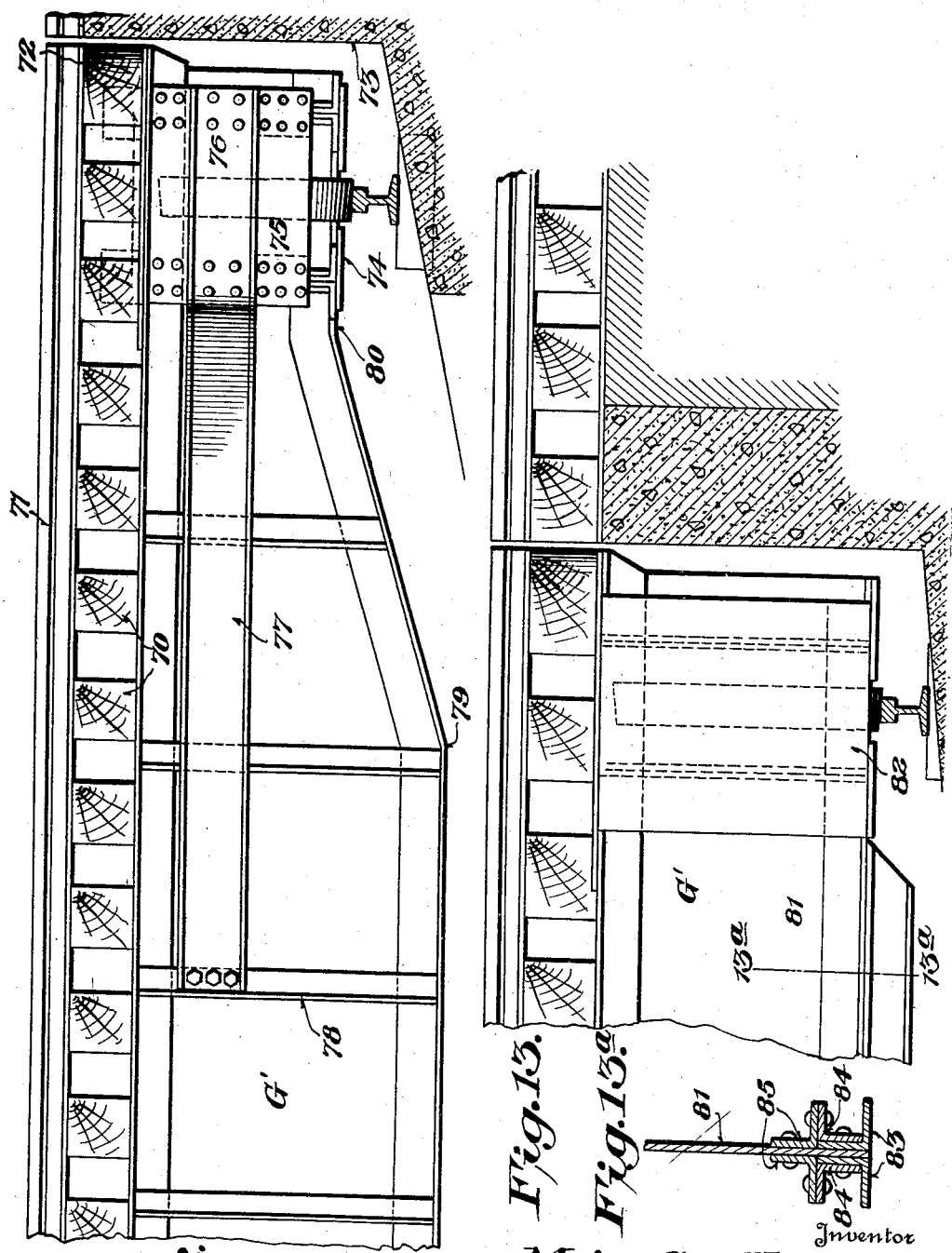

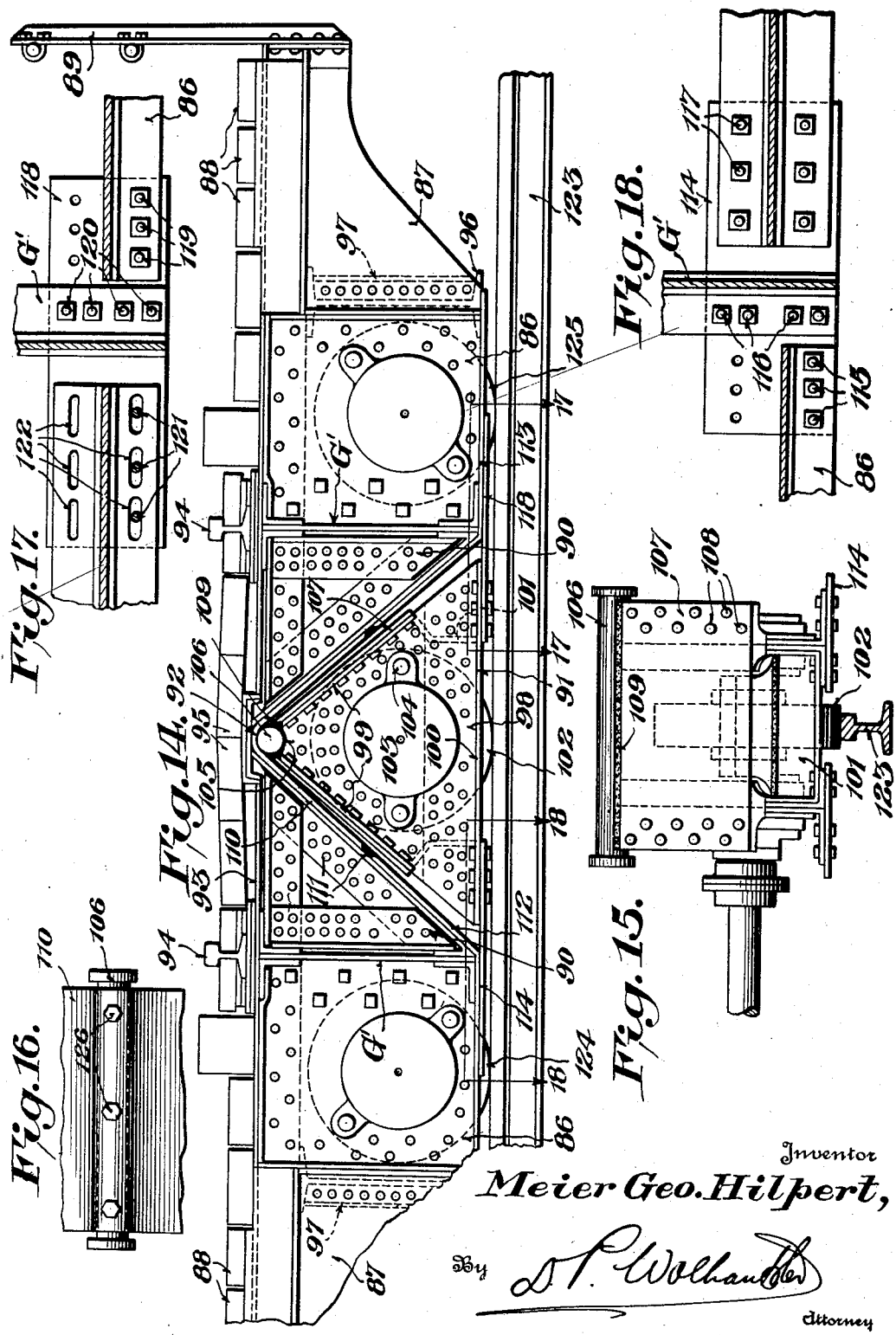

1,811,931

UNITED STATES PATENT OFFICE

MEIER GEORGE HILPERT, OF BETHLEHEM, PENNSYLVANIA

EQUALIZING TRUCK CONSTRUCTION

Application filed January 5, 1929. Serial No. 330,674.

This invention relates to a novel equalizing truck construction for structural spans adapted particularly for use as turntables, transfer tables, bridge cranes, and the like.

My companion application, Serial No. 330,672 filed of even date herewith illustrates and describes structural span constructions wherein a pair of main load supporting members or girders are provided and are transversely braced throughout their central parts to prevent relative flexing. The end sections of these girders are provided with a horizontal line of bracing which may occur approximately on the plane of the top flanges of the girders; on a plane substantially intersecting the center line of the webs of the girders; or substantially on the plane of the bottom flanges of the girders. This line of bracing determines an axis of flexure due to truck movements for the ends of the main girders. A two-wheeled tandem truck is rigidly attached to each end of the main girders so that as the wheels of the truck travel over the rail, the inequalities in the latter will cause the wheel frames to flex the ends of the girders so as to equalize the unit's total end load through the wheels to the rail.

In the preferred embodiment of the invention disclosed in the above referred to application, a metallic deck plate is employed as the horizontal line of bracing between the main girders and this deck plate acts to protect the entire mechanism normally occurring beneath the deck of a structural span. At each end of the span, the deck plate is reinforced transversely to provide an engine wheel receiving platform, so that if the span is not set exactly right and an engine truck drops off of the rails onto the deck of the span, the truck will be supported by the wheel frames and the steel deck.

A primary object of the present invention is to carry forward the general features disclosed in the above referred to application by applying to each end of a span, having said end flexing girders, a three-wheeled (tandem) equalizing compound truck.

A distinctive object of the invention is to attach a compound truck of the above referred to type to the end under a span so that the end load of a span may be distributed as desired between the three wheels of the truck and thence to the circular rail; i. e., so that each wheel will bear an equal one-third of the entire load, or so that the central wheel will bear a greater or lesser load than either of the outer wheels, by such amount desired.

Another object of the invention is to attach the various wheels of a three-wheeled (tandem) compound truck to the flexible ends of the main load supporting members so that relative movement may occur between the said wheels, with their mountings or frames, when inequalities in a rail require the flexing of the ends of said members to equalize the unit's total end load to the rail.

A further object of the invention is to provide means whereby a single truck frame may be rigidly attached to each of the main load supporting members and such frames may be flexibly connected together to permit of relative flexing of the ends of the said members. The third wheel of each of the three-wheeled compound trucks is carried by a frame which floats with respect to the remainder of the compound truck and is connected to the main load supporting members in such a manner as to receive and bear its intended portion of the total end load.

A still further object of the invention is to design the boxed-in single wheel and axle truck so that it may be easily assembled, exactly alined (that is square with the table for cranes or transfer tables or the axles extending radially and level for turntables) and then made rigid or integral with a girder by welding, so that thereafter the bearings, wheels and axles, and side frames are removable and replaceable, all with the alinement retained, and the like side frames and machine parts, wheels, axles, bearings and boxes, etc., are interchangeable.

Other objects of the invention are to design a boxed bracket for the inside of girders adapted to oppose the tensions and compressions of the opposite-outer-boxed trucks; to place a suitable portion of the load upon a central floating truck; to removably hold said floating truck to alinement; to be easily assembled; and, when set by the exact alinement of the floating truck then made rigid or integral with the girder by welding for full bracket shears and preferably for full tensions; and thereafter said floating truck may be removed and replaced and true alinement thereof held by the said two boxed-between-girder-brackets. Also, the invention contemplates the motivating of a unit at either or both ends by means of one or more prime movers located on the non-flexing part of a span and providing shafting and universal (or flexible) joints as connections preferably to the central floating truck single wheel axle extension whereby a central alinement of all machinery may be obtained.

With the above and other objects in view which will more readily appear as the nature of the invention is better understood, the same consists in the novel construction, combination and arrangement of parts hereinafter more fully described, illustrated and claimed.

Preferred and practical embodiments of the invention as shown in the accompanying drawings, in which:—

Figure 1 illustrates diagrammatically one preferred form of structural span wherein the ends of the main girders are braced so as to determine an axis of flexure which occurs on the line A—B. The line A'—B' illustrates a different axis of flexure about which the ends of the girders will flex when certain bracing elements are omitted.

Figure 1a is an end elevational view of the structural span illustrated in Figure 1.

Figure 1b is an end elevational view of a span very similar in construction to the span illustrated in Figs. 1 and 1a but possessing one main modified feature of construction.

Figure 2 is a diagrammatic view of another preferred form of structural span but illustrates the use of a cross-tie deck instead of a steel deck plate as embodied in the structures shown in Figs. 1, 1a and 1b.

Figure 2a illustrates in end elevation the structural span disclosed in Fig. 2.

Figure 2b illustrates diagrammatically the manner in which the main girders will flex in the structures disclosed in Figs. 1 to 2a.

Figures 3, 3a and 3b are similar to the views shown in Figs. 2, 2a and 2b but disclose a structural span wherein the line of bracing is located on a plane which will substantially intersect the center lines of the webs of the main girders whereby an axis of flexure will be determined. The lines A—B and C—D illustrate the limits of the flexing of the girder ends with an axis approximating line S'—B.

Figures 4, 4a and 4b are views similar to those shown in Figs. 2, 2a and 2b but illustrate a structural span wherein the horizontal line of bracing occurs in the region of the lower flanges of the main girders so as to cause the ends of the girders to have a limit of flexure occurring along the line A—B.

Figures 5 and 5a illustrate diagrammatically, in side and end elevations respectively, a prior form of three-point supported turntable, or the like.

Figure 6 is a view taken on line 6—6 of Fig. 7 and illustrates one form of three-wheeled (tandem) equalizing compound truck embodying this invention.

Figure 7 is an end elevational view of the truck structure shown in Figure 6.

Figure 8 is an end elevational view of a modified form of compound truck structure embodying this invention.

Figure 9 is a fragmentary end elevational view of another form of truck structure.

Figure 10 is a similar view to Figure 9 but illustrates a still further modified form of structure.

Figure 11 is a top plan view, partly broken away, of an end part of a structural span and illustrates in detail a portion of a cross-tie deck, a manner of attaching a compound truck structure to the main load supporting members, and a manner in which a span may be motivated so as to provide a central alinement for all machinery.

Figure 12 is a fragmentary side elevational view showing in detail a number of structural features of a span embodying this invention.

Figure 13 is a similar view to Figure 12 but illustrates a modified form of span.

Figure 13a is a fragmentary vertical sectional view taken on lines 13a—13a of Figure 13.

Figure 14 is a highly developed end elevational view of a structural span and a three-wheeled (tandem) compound truck structure associated therewith.

Figure 15 is a detail side elevational view of a floating truck structure which forms a part of the construction illustrated in Fig. 14.

Figure 16 is a fragmentary plan view illustrating one manner in which a truck may be constructed so as to be connected to the remainder of a three-wheeled compound truck to permit floating of the truck illustrated, Figure 17 is a fragmentary horizontal sectional view taken on line 17—17 of Figure 14, and Figure 18 is a similar view to Figure 17 but taken upon line 18—18 of Figure 14.

Similar reference characters designate corresponding parts throughout the several figures of the drawings.

As has been stated heretofore, it is the primary object of this invention to combine with the main load supporting members, of a structural span, a three-wheeled compound truck and to connect the several wheels of such a truck to the load carrying members so that inequalities in the supporting rail will cause the wheels with their truck frames to flex the ends of the said members.

Before describing any of the various embodiments of the present invention, it is desired to point out, for the purpose of comparison, to disclose and describe the prior or present accepted form of three-point supported turntable. Figures 5 and 5a illustrate such a structural span. In this construction, the main girders G are braced transversely at desired intervals by the struts S. These struts correspond in depth with the girders and cooperate with the rigid top bracing T and the similar bottom bracing T' to provide a rigid, non-flexible structure throughout the length of the span. Figure 5a discloses the fact that each main girder G is mounted upon a two-wheeled equalizing truck F. One of the truck frames F at each end of the span is extended as at F' and a motivating power unit M is mounted thereon and suitably connected to one of the wheels of the truck, whereby the entire span is driven. The span is centrally supported at H, in the manner illustrated. Like construction is applied to cranes and transfer tables except that the centering and part load carrying device H is omitted and the rails are made parallel while the axles set square with the unit.

In Figs. 1 and 1a, I have illustrated diagrammatically a preferred embodiment of turntable mounted on a central pivot M'. This structural span includes main girders G' which are transversely braced by the struts S' or S''. A line of bracing is provided along the top of the span, or along the line indicated by the character a. With the transverse struts arranged as illustrated, the ends of the main girders will flex along the axis of flexure indicated by the line A—B. If the transverse strut S'' is omitted, the axis of flexure for the ends of the main girders will then be indicated by the line A'—B'.

Fig. 1a illustrates the rigid connection of a truck frame I to each main girder. A third or central truck frame J is positioned between the truck frames I and floats with respect thereto. A connecting pin K is provided for receiving a portion of the end load of the span from the main girders G'. A suitable tension or stabilizing link connection L is provided between one of the rigid trucks I and the floating truck J.

In the form of truck illustrated in Fig. 1b the manner of connecting the floating truck J to the outer trucks I and the main girders G' is changed. In this form, spaced pins K' are provided for transferring portions of the loads borne by the girders G' to the floating truck J. This double pin connection gives greater stability to the floating truck. A link connection L also is used in this form of truck.

In Figs. 2 to 2b, the steel deck plate which is employed in the structure shown in Fig. 1 as the top line of bracing a is omitted and a strut and diagonal bracing system with a cross-tie deck b is substituted. It is noted at this point that the use of a steel deck plate, as shown in Fig. 1, materially reduces the depth of a span over the necessary depth where cross-ties b are employed. This span includes main girders G' and the transversely extending frames S'. These frames are omitted at the ends of the girders and the top bracing the said girder ends so that an axis of flexure will be determined along the line A—B. The use of a cross-tie deck b allows of spreading the main girders G' from ordinary track gauge width to any desired width, as for very long spans which require greater width for adequate and economical transverse strength. The central floating truck frame J receives its load from the truck frames I and the main girders by any suitable form of connection occurring at K''.

In Figs. 3 to 3b, the line of bracing for the ends of the main girders G' has been dropped to the center line of the said girders whereby the axis of flexure likewise will be dropped to approximately this portion of the said girder ends. Where the axis of flexure occurs along the center line of the webs of the girders, as in the structure illustrated in these figures, the central truck J is loaded by the truck connection N between the truck frames I, which are rigidly connected to the main girders G', and the said floating truck J.

In Figs. 4 to 4b, the line of bracing has been dropped to the plane of the lower flanges of the girders G', as indicated by the character c. The truck frames I, rigidly connected with the main girders G' are connected with the floating truck J by means of spaced pins K and it will be noted that the floating truck is now in greater stable equilibrium.

In Figs. 6 and 7 there is shown one form of truck of the three-wheeled (tandem) compound type. The main girders G' have permanently fastened to the outer sides thereof the wheel boxes 10. These boxes include side plates 11, bottom plates 12, and top plates 13. The bearings 14 are mounted in apertures formed in the plates 11 and have journaled therein the axle 15 of the wheel 16. In accordance with the disclosure of a fabricated truck structure made in my application, Serial No. 221,120, filed Sept. 21, 1927, these outside wheel boxes are positioned, with the bearings 14 and the wheel and axle structures 16 and 15 removed, adjacent to the main girders G' and by means of suitable sighting instruments, properly alined. The plates 11 are then welded to the main girders along the line 17.

Suitable loading brackets 18 are provided and consist of angles 19 and 20 which are connected to extensions 12a and 13a of the bottom and top plates 12 and 13 respectively of a wheel box. It is to be understood that two of each of the angles 19 and 20 are employed for each loading bracket 18. The brackets further include plates 21 which are suitably riveted to the angles 19 and 20. These plates 21 are provided with flanges 22 which converge toward the top of the truck and at their upper ends are provided with extensions 23. Mounted in these extensions 23 are the pins 24 employed for connecting the loading brackets to the central floating truck 25.

This central floating truck includes side plates 26 having reinforcing angles 27 suitably secured thereto and being connected in spaced relation with each other by channels 28 so that the plates 26 will be arranged on opposite sides of the wheel 29. The shaft 30 for this wheel is mounted in suitable bearings 31 fastened to the plates 26 by means of thrust bolts 32. For further reinforcing the side plates, the same are provided with angles 33 connected to the lower ends of the angles 27. A stabilizing or tension link 34 is connected to one end of this angle 33 and has its remaining end connected to an angle 35 attached to one of the loading brackets 21. The bearings 14 and 31, in Fig. 7, are illustrated as having suitably attached thereto oiling devices 36 whereby the bearings may be properly lubricated.

The cross-tie deck 37 is mounted upon the main girders G but is maintained in spaced relation with respect to the upper flange portions of the same by means of the longitudinally extending planks 38. The track rails 39 are mounted upon the cross-tie deck 37 and in this embodiment are spaced inwardly from the main girders G'. The cross-tie deck is extended laterally a sufficient distance to provide a walkway 40 having the hand rail 41 at the outer edge thereof.

The axle 30 for the wheel 29 of the floating truck frame 25 is extended at 30a and is connected by a universal or flexible joint 42 to a shaft section 43. This shaft section is intended to extend longitudinally of a span so that it may be connected to a prime mover arranged within and supported by the central part of the main girders; i. e., the non-flexing portion of the span. This motivating connection with the single wheel of the central floating truck provides for a central alinement for all machinery.

In Fig. 8 a three-wheeled compound truck structure is illustrated which is very similar to the form shown in Figs. 6 and 7. The truck structure now being described includes the main girders G' to the outer sides of which the wheel boxes 44 are suitably secured. The top and bottom plates 45 and 46 of these wheel boxes are extended to connect to the said boxes the loading brackets 48. These loading brackets deliver a predetermined portion of the end load of a span to the central floating truck frame 49 through the medium of the pins 50. A tension plate 51 connects the central floating truck frame 49 to one of the main girders G' and its rigidly attached wheel box 44. Wooden ties 52 are mounted directly upon the top flanges of the girders G' and have suitably mounted thereupon the track rails 53.

In Figs. 9 and 10, two different forms of main girders are illustrated. In Fig. 9 a single girder 54 is illustrated and has attached to the upper edge thereof a plate deck 55 of the character disclosed in detail in my application referred to at the beginning of this specification, and to which reference is made for a more complete understanding of the same. The single girder 54 has a wheel box 56 rigidly attached thereto and a loading bracket 57 is provided for connecting the central floating truck 58 to the girder 54. The track rail 59 is mounted directly upon the deck plate 55 and is positioned in vertical alinement with the web of the girder 54. A tension plate 60 connects the central floating truck frame 58 to the girder 54 and the wheel box 56.

In Fig. 10 a box girder 61 is illustrated. A plate deck 62 is mounted over this girder 61 and a wheel box 63 is attached to the outer web of said girder. The track rail 64 is mounted directly over the center of the box girder. The remainder of the truck structure is identical with that shown in Fig. 9 and similar reference characters will be applied.

In Fig. 11 there is shown partly in top plan and partly in section an end portion of a structural span having a three-wheeled (tandem) compound truck attached thereto. This figure more clearly illustrates the manner in which the truck disclosed in Figs. 6 and 7 is associated with the end of a structural span and discloses more of the central alinement for all machinery. Similar reference characters will be applied to elements in Fig. 11 corresponding with those in Figs. 6 and 7.

A specific form of bracing for the ends of the main girders is shown in this Fig. 11. This bracing includes a transversely extending angle or strut 65 which is connected at its opposite ends to the flanges of the main girders G' by the plates 66. These plates also attach to the transverse angle 65 and the flanges of the girders crossed angles 67 which are interconnected at their point of intersection by the splice plate 68. The remaining ends of these crossed angles 67 are connected to the girders and the loading trucks 19 by means of plates 69.

Fig. 12 shows in side elevation an end portion of a structural span embodying this invention. In this embodiment, the main girders G' have mounted thereon a cross-tie deck 70 to which are secured the track rails 71. The end cross-tie for this deck 70, is rounded at 72 so as to conform with the contour of the pit 73. For the purpose of bracing the wheel box 74 and rigidly attaching to the girder G', an end plate 75 is provided for the said box and has attached thereto the angularly arranged end 76 of a channel brace 77. This brace extends longitudinally of the span and is connected at its inner end to a vertically extending angle 78 carried by the main girder. The bottom flange of the main girder, in this form of span, is curved upwardly at 79 and then outwardly at 80 for attachment to the wheel box 74.

In Figs. 13 and 13a a modified girder structure is illustrated. In this embodiment, the web 81 of the girder G' extends below the wheel box 82 and has flange members 83 attached to its lower edge. Angles 84 are attached to the vertical legs of the flange angles 83 and these angles 84 have attached thereto additional angles 85 which in turn are secured to the girder web 81 inwardly of its edge.

In Figs. 14 to 18, inclusive, there is illustrated in detail a truck structure embodying this invention. In this structure, the main girders G' have rigidly attached thereto the wheel boxes 86, the said boxes being arranged on the outside of the said girders. The front plates of the wheel boxes 86 are extended at 87 for forming a support for a walkway 88 having a hand rail 89. Each wheel box 86 and its attached girder G' has a loading bracket 90 suitably connected thereto. A floating central truck 91 is attached to the load bearing brackets 90 by the structure referred to in its entirety by the reference character 92. The details of these various elements 90, 91 and 92 will be described at a later point.

A line of bracing for the structural span is provided at the top of the main girders and consists of a top deck plate 93. The track rails 94 are mounted upon this deck directly over the webs of the girders G'. Cushioning timber 95 is mounted upon this deck plate 93 and cooperates with the plate for forming a platform for receiving derailed engine wheels. The end portion of the deck plate 93 is intended to be braced in the manner disclosed in my above referred to application, Serial No. 330,673 for forming this engine wheel receiving platform. The reference character 96 is employed in Fig. 14 for designating the stringer disclosed in my application, Serial No. 330,673 and having a flexible connection 97 with a wheel box at one end. The remaining end of this stringer is intended to be flexibly connected to the adjacent main girder.

The floating truck 91 is of a fabricated design and includes the side plates 98 of triangular formation. Each side plate 98 is reinforced at its marginal edges by angles 99 and 100. The side plates are connected at the lower outer ends by the angles 101 which brace the plates and maintain the same in spaced relation with respect to each other for receiving the wheel 102 therebetween. The side plates 98 are provided with bearing openings for receiving the bearings 103. The said bearings are attached to the plate by the tension bolts 104. During the manufacture of this floating truck, the side plates interconnected by the angles 101, are mounted upon a dummy bearing, not shown, and the apex of each triangular side plate is provided with a half hole, the said half holes being in axial alinement parallel to the dummy bearing.

A pin 106 is then laid in the half holes at the apices of the side plates. Plates 107 are then laid upon the angles 99, carried by the downwardly diverging edges of the side plates 98, and are bolted thereto by the elements 108, see Fig. 15. After securing the plates 107 to the side plates 98, the pin 106 is welded to the plates 107 along the full lengths of the upper edges of the plates 107, as designated at 109. This permanently secures the pin 106 to the plates 107 and it will be noted that these latter plates are detachably connected to the side plates 98 by the bolts 108.

To assemble and aline the floating truck 91 with respect to the loading brackets 90, the end of the span is elevated and so supported and the truck then may be slid between the loading brackets. With the end of the span raised to a proper height, a clearance will be provided between the lower edges of the loading brackets 90 and the top edges of the floating truck, 91. A bent plate 110 is placed over the pin 106 and bears upon the upper half of the latter and against the full lower faces of the loading brackets. The axle holes in the side plates 98 are now employed for alining the floating truck frame 91 and the plate 110, as now alined, is held in place by suitable clamping means, not shown, against the loading brackets.

The floating truck then should be removed and the plate 110 welded at its lower edges 111 to the upper edges of the extensions 112 formed on the bottom plates 113 of the wheel boxes 86. The floating truck frame 91 now may be returned and the end of the span may be lowered so that the bent plate 110 rests upon the pin 106.

A tension plate 114 (see Fig. 18) is connected by bolts 115 to the left hand wheel box 86 and by bolts 116 to the main girder G'. The plate 114 also is connected to the floating truck 91 by means of bolts 117.

In Fig. 17, a second tension plate 118 is illustrated. This tension plate is connected to the remaining wheel box 86 by bolts 119 and to the remaining main girder G' by bolts 120. The tension plate 118 is connected to the bottom adjacent portion of the floating truck 91 by means of bolts 121 which are carried by the tension plate and which pass through slots 122 formed in the bottom flange of the said floating truck.

It now will be understood that when inequalities in the rail 123 mounted in the pit for supporting the structural span disclosed in these figures, cause either the left hand wheel 124 or the wheel 102, carried by the floating truck 91, to rise the end portion of the main girder G' appearing at the left in Fig. 14 will be flexed at the bottom. This is due to the fact that wheels 102 and 124 move as a truck. When the rail inequalities cause the wheel 125 to raise or lower, the main girder G' appearing at the right hand side of Fig. 14 flexes and pivots about the pin 106. This relative pivoting is made possible by the bolt and slot connection 121 and 122 disclosed in detail in Fig. 17.

Fig. 16 discloses the manner in which the plate 110 may be attached to the pin 106, as by means of the bolts 126.

Without further description it is thought that the features and advantages of the invention will be readily apparent to those skilled in the art and it will of course be understood that changes in the form, proportion and minor details of construction may be resorted to without departing from the spirit of the invention and scope of the appended claims.

I claim:—

1. A movable structural span of the class described, including a pair of main load supporting members, bracing means for said members for determining an axis of flexure for the end portions of the same, and a truck associated with an end of the span for permitting the end portions of the said members to flex independently.

2. A movable structural span of the class described, including a pair of main load supporting members, transverse bracing means for the intermediate parts of the members to prevent relative flexing of the latter, bracing means for the end portions of the members for determining an axis of flexure for each of the same, and a truck structure associated with the adjacent ends of said members and constructed to permit relative flexing of the members.

3. A movable structural span of the class described, including a pair of main load supporting members, transverse bracing means for the intermediate parts of the members to prevent relative flexing of the latter, bracing means for the end portions of the members for determining an axis of flexure for each of the same, and a truck structure associated with the adjacent ends of said members and constructed to permit relative independent flexing of the ends of the members.

4. A movable structural span of the class described, including a pair of girders, transverse bracing means for maintaining rigid the intermediate portions of the girders, a line of bracing for the end portions of the girders whereby an axis of flexure is determined for the same, and a three-wheeled compound truck supporting the adjacent ends of the girders.

5. A movable structural span of the class described, including a pair of main girders, bracing means for the girders which will determine an axis of flexure for the end portions of the same, and a three-wheeled compound truck connected to the adjacent ends of the girders and permitting independent flexing of the latter.

6. A movable structural span of the class described, including a pair of girders, transverse bracing means for the intermediate portion of the girders to prevent relative flexing of the same, a horizontally extending line of bracing for the end portions of the girders whereby an axis of flexure is determined for the same, and a three-wheeled compound truck structure connected to the ends of the girders to permit independent flexing of the same, said compound truck structure including a wheel frame rigidly connected with each girder, an additional wheel frame, means for connecting the first two wheel frames to each other and to the third wheel frame, and a wheel for each of said frames.

7. A movable structural span of the class described, including a pair of main girders, struts interconnecting the intermediate portions of the girders for preventing flexing of the same, a deck structure connected to the end portions of the girders for bracing the same so as to determine an axis of flexure for said end portions, and a truck structure connected to the adjacent ends of the girders and permitting independent flexing of the same.

8. A movable structural span of the class described, including a pair of main girders, struts interconnecting the intermediate portions of the girders for preventing flexing of the same, a deck structure connected to the end portions of the girders for bracing the same so as to determine an axis of flexure for said end portions, and a three-wheeled compound truck structure connected to the ends of said girders and including independently movable wheel frames.

9. A movable structural span of the class described, including a pair of main girders, struts interconnecting the intermediate portions of the girders for preventing flexing of the same, a deck structure connected to the end portions of the girders for bracing the same so as to determine an axis of flexure for said end portions, and a three-wheeled compound truck structure for the ends of the girders, said truck structure including a wheel frame rigidly attached to the outer side of each girder, a wheel frame positioned between the said girders, and means for connecting the girders to the last mentioned wheel frame for permitting relative movement of the various frames.

10. A movable structural span of the class described, including a pair of main girders, bracing means for the adjacent end portions of the girders which will permit relative flexing of the same, a three-wheeled compound truck structure connected to the end portions of the girders, and means for causing two of the wheels to move when the end portion of one girder is flexed, and means for causing the remaining wheel to move when the end portion of the remaining girder is flexed.

11. A movable structural span of the class described, including a pair of main girders, a line of bracing for the ends of the girders whereby a predetermined axis of flexure is established, and a three-wheeled compound truck connected to the ends of the girders, said truck including a wheel frame rigidly attached to the end portion of each girder, a wheel frame located between the ends of the girders, a loading bracket connected to each girder and extending transversely to be pivotally connected to the intermediate wheel frame, and a tension element rigidly connecting one of the girders to the intermediate wheel frame.

12. A movable structural span of the class described, including a pair of main girders, a three-wheeled compound truck connected to the adjacent ends of the girders and having wheels arranged in tandem, and motivating means for the span including a drive shaft connected to the central wheel of said truck.

13. A movable structural span of the class described, including a pair of main girders, means for bracing the intermediate portions of the girders to prevent flexing of the same, means for bracing the end portions of the girders to permit relative flexing of the same, a three-wheeled tandem truck connected to the adjacent ends of the girders, and motivating means for the span connected to the central wheel of the truck and extending along the center line of the span.

14. A movable structural span of the class described, including a pair of main girders, means for bracing the adjacent end portions of the girders for permitting relative flexing of the latter, a truck frame rigidly attached to the end portion of each girder, a bracket rigidly attached to each girder, means for flexibly connecting the brackets, and a third wheel frame pivotally connected to the last mentioned means.

15. A movable structural span of the class described, including a pair of main girders having independently flexible end portions, a track rail supported by each girder, a truck frame rigidly connected to the outside of each girder, a loading bracket connected to the inside of each girder, and a central floating truck frame connected to said loading brackets.

16. A movable structural span of the class described, including a pair of main girders, means for bracing the end portions of the girders to permit relative independent flexing of the same, and a three-wheeled tandem truck structure connected to the adjacent ends of said girders, said truck structure including a truck frame rigidly attached to each girder, a pair of substantially triangular loading brackets connected to the inner sides of the girders, means for interconnecting the loading brackets in substantially the same plane as the top webs of the girders, and a floating truck frame pivotally connected to the loading brackets adjacent the point of connection between the latter.

17. A compound truck for structural spans including the load supporting members for such span, a truck frame rigidly attached to each load supporting member, interconnected loading brackets secured to said members, and a floating truck frame removably connected to said loading brackets.

18. A compound truck for structural spans including the load bearing members of such span, interconnected loading brackets secured to said members, a truck frame pivotally connected at its top portion to said loading brackets, means for rigidly attaching said truck frame to one of said load bearing members, and means for relatively movably connecting the truck frame to the other of said load bearing members.

19. A floating truck for structural spans including a pair of parallel plates, a wheel structure connected to the plates, means for bracing and maintaining in spaced relation said plates, and a load bearing member secured to the tops of said plates and extending in parallelism with the axis of the wheel.

20. A floating truck for structural spans including a pair of triangular plates, means for interconnecting and bracing the plates to permit separation of the latter, and a load bearing member removably connected to the plates.

In testimony whereof I hereunto affix my signature.

MEIER GEORGE HILPERT.